United States Patent

Bechet et al.

[15] 3,648,148
[45] Mar. 7, 1972

[54] CONTROL MEANS FOR AN AC-DC OR DC-AC ENERGY CONVERTER FOR CARRYING DIRECT CURRENT ENERGY

[72] Inventors: Louis Bechet, Decines; Claude Bertholon, Saint-Etienne, both of France

[73] Assignee: Compagnie Generale D'Electricite, Paris, France

[22] Filed: June 10, 1970

[21] Appl. No.: 44,957

Related U.S. Application Data

[63] Continuation-in-part of Ser. No. 791,616, Jan. 16, 1969.

[52] U.S. Cl. ...................................321/5, 321/13, 321/38, 321/40
[51] Int. Cl. .................H02m 1/02, H02m 1/18, H02m 7/12
[58] Field of Search .................................321/5, 11–13, 38, 321/40, 47

[56] References Cited

UNITED STATES PATENTS 3,525,032  8/1970  Torok ...................................321/38 X
3,551,778  12/1970  Ekstrom ................................321/38 X
3,536,985  10/1970  Ekstrom ................................321/40 X

FOREIGN PATENTS OR APPLICATIONS 1,557,147  2/1969  France .......................................321/5

Primary Examiner—William H. Beha, Jr.
Attorney—Sughrue, Rothwell, Mion, Zinn & Macpeak

[57] ABSTRACT

Disclosed herein is a high-voltage direct current converter control device for a direct current energy transmission line comprising an angle computer controlling a pulse generator. The direct current powerline is equipped at each of its ends with a bridge having control rectifier cells. The optimum cell ignition times are calculated considering the requirements of a power transmission program to be carried out and impulses are fed to the cells at instances calculated according to the techniques of the present invention. In accordance with this technique, from a first pulse train corresponding to the successive zero passage of voltage at the terminals of one of the cells of the converter is derived a second pulse train comprising six times as many pulses as the first pulse train, the pulses in the second pulse train being equally spaced over a time T defined as the time between the successive pulses in the first pulse train. The pulses in the second pulse train correspond to the theoretical times for the zero passages of the voltage at the terminals of the six cells of the converter bridge. The actual zero passage times are measured and numbers $\epsilon$ proportional to the interval of time separating the passage of theoretical zeros and the actual zeros at each of the cells are measured and the maximum value of $\epsilon$ is determined. Further, two numbers termed the rectifier stop and the inverter stop are determined on the basis of the maximum value of $\epsilon$, the bridge regulation angle $r$, the maximum trespass angle of the cells $u$ and the angle of the extinction of the cells $\gamma$. On the basis of the rectifier stop, the inverter stop and the second pulse train, ignition impulses for the cells are developed.

9 Claims, 19 Drawing Figures

Patented March 7, 1972

INVENTORS
LOUIS BECHET
CLAUDE BERTHOLON
BY Sughrue, Rothwell, Mion,
Zinn & Macpeak
ATTORNEYS

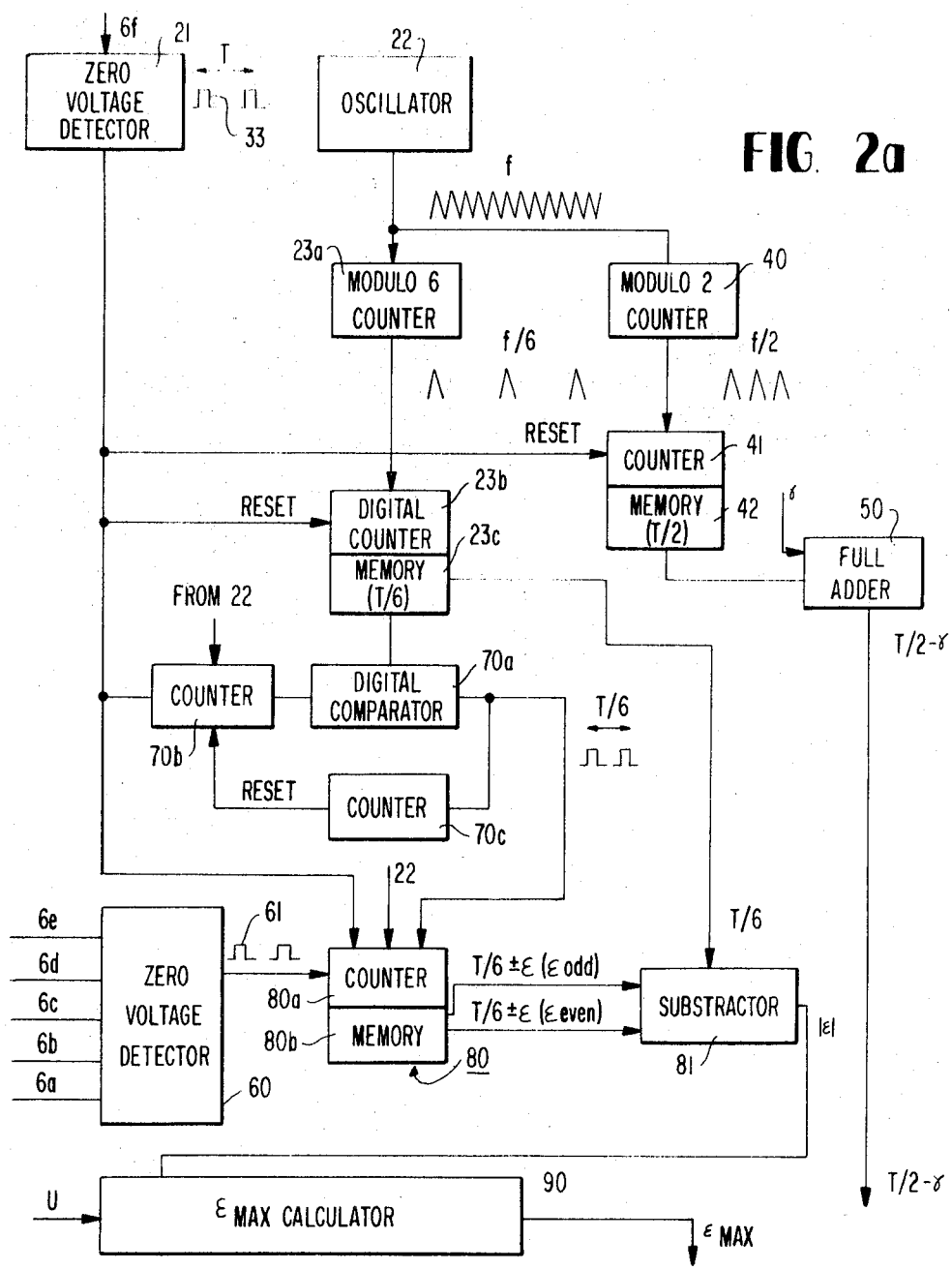
FIG. 2a
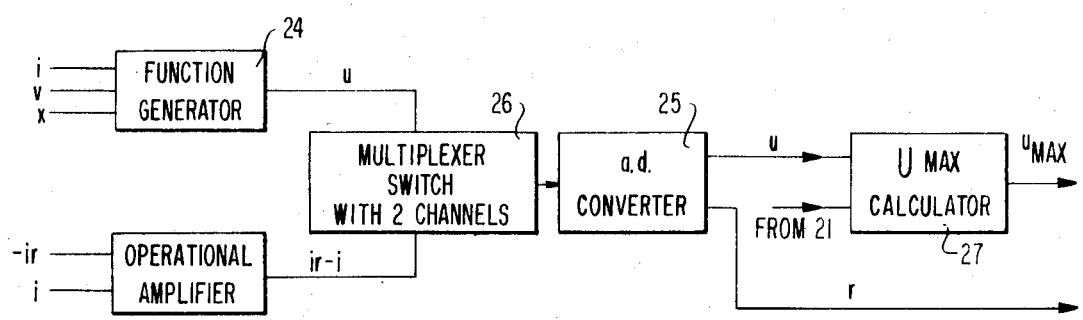

FIG. 2b THEORETICAL ZERO VOLTAGE POINTS (SECOND PULSE TRAIN)
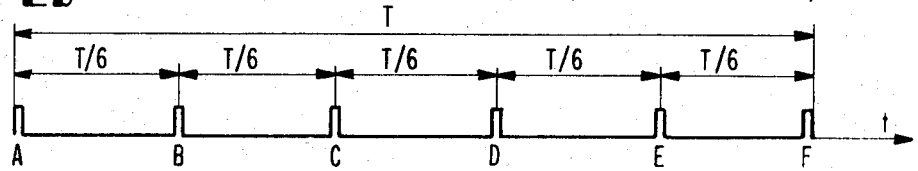
FIG. 2c REAL ZERO VOLTAGE POINTS (THIRD PULSE TRAIN)
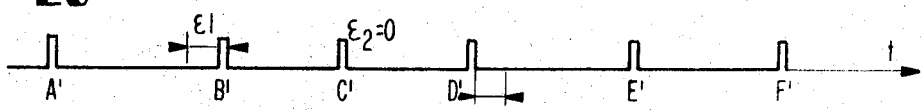
FIG. 2d
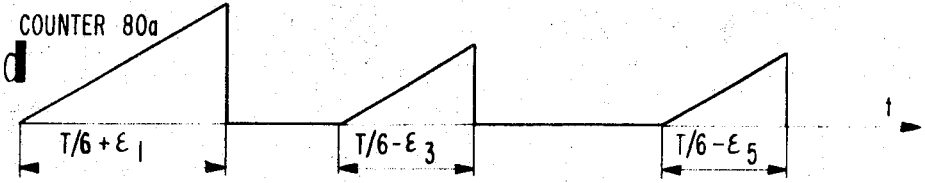
FIG. 2e
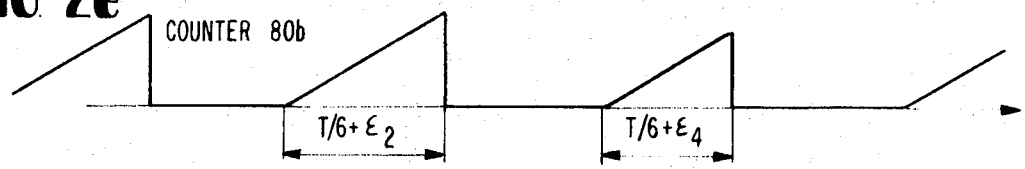
FIG. 2f
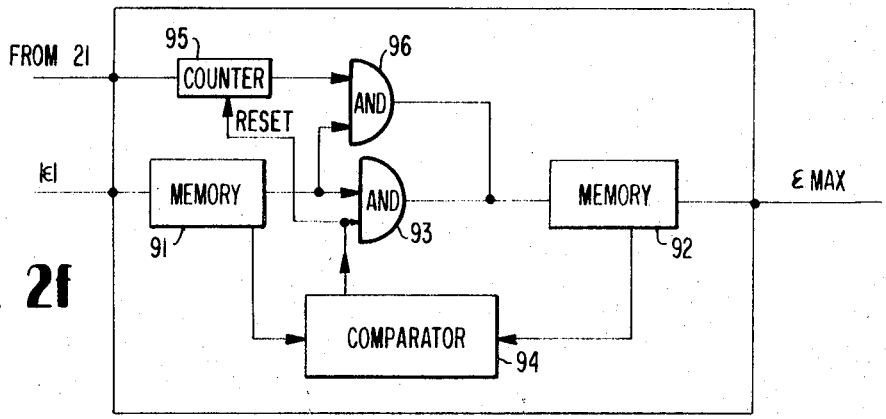
FIG. 2g
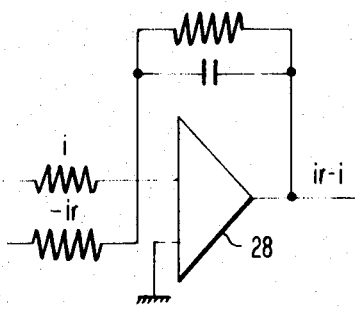

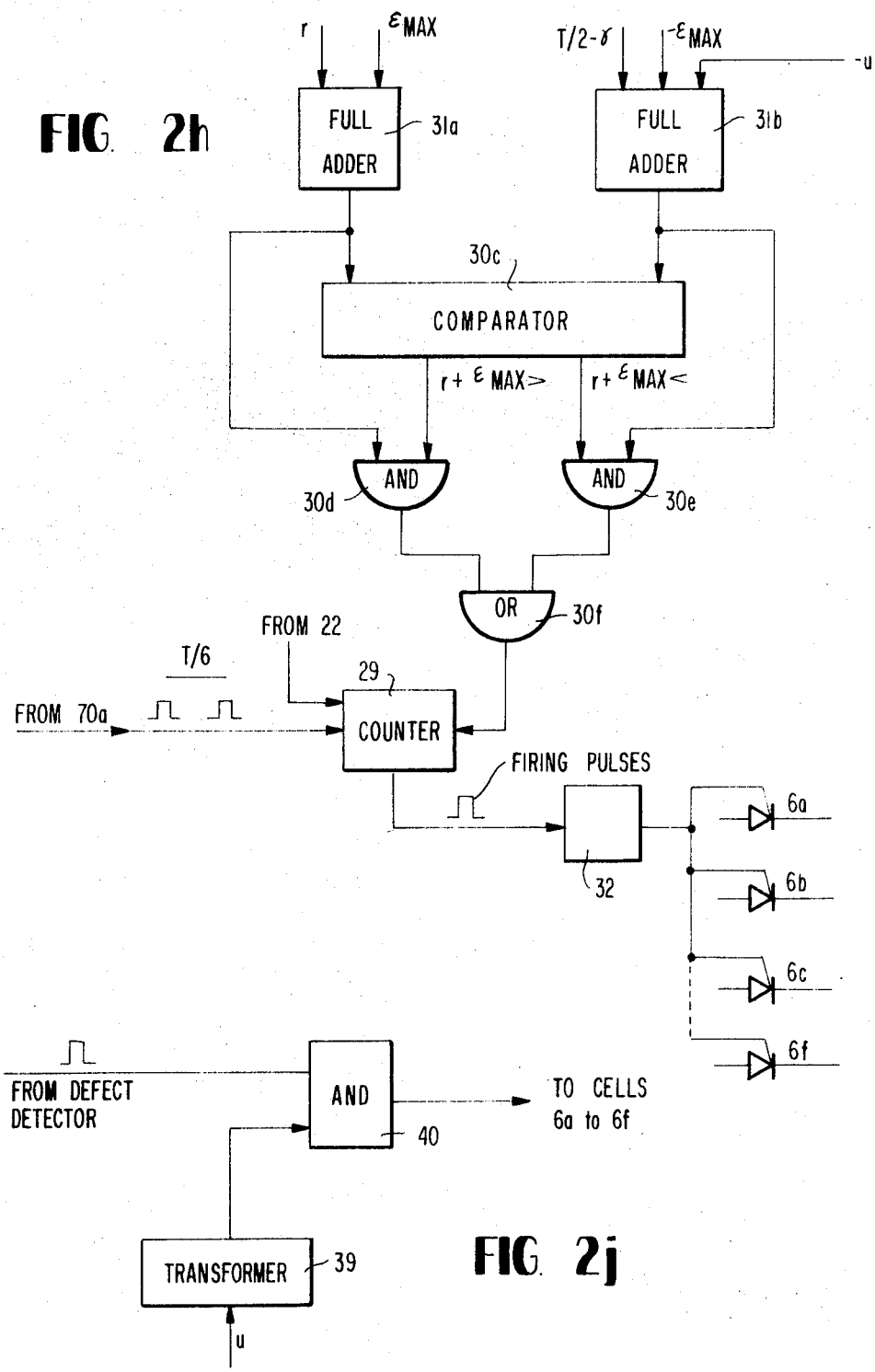

FIG. 3a
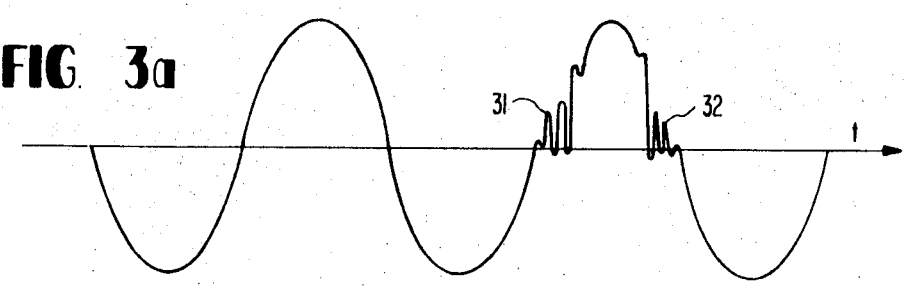
FIG. 3b
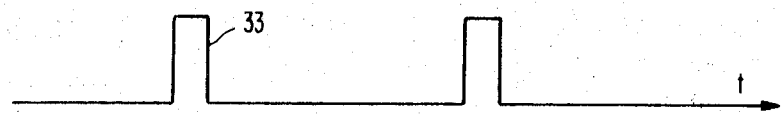
FIG. 3c
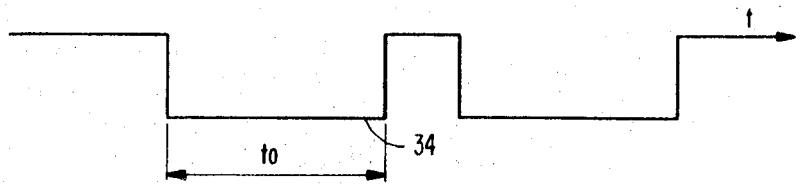
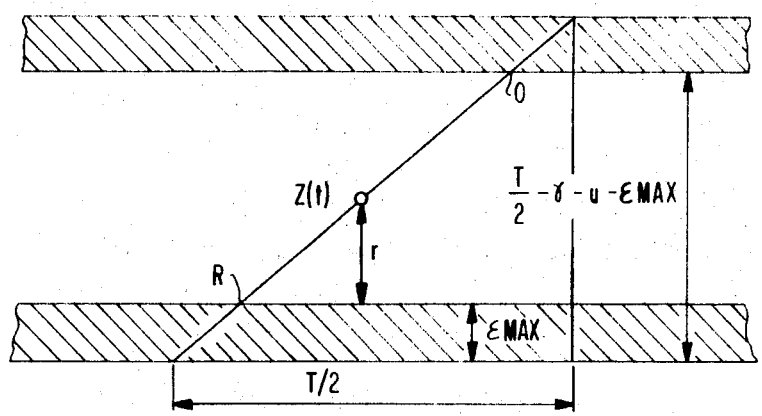
FIG. 5

CONTROL MEANS FOR AN AC-DC OR DC-AC ENERGY CONVERTER FOR CARRYING DIRECT CURRENT ENERGY

RELATED CASES

This application is a continuation-in-part of application Ser. No. 791,616, filed Jan. 16, 1969.

In a DC powerline equipped at each of its ends with a bridge having controlled rectifier cells, the optimum instant for the ignition of the cells is calculated considering the requirements of a power transmission program to be carried out, and impulses are fed to the cells at said instants.

This invention is intended to provide a device for the elaboration of control impulses for an electrical power converter, involving six cells mounted in a three-phase bridge, between an AC network and one end of a DC power transmission line, involving the following:

Means that process a first train of impulses, corresponding to the successive zero passages of the voltage at the terminals of one of the cells of the converter;

Means for processing, from the first impulse train, a second train of impulses which will be spaced apart from each other by an interval of time equal to one-sixteenth of the interval of time T separating two consecutive impulses of the first train, the impulses of the second train corresponding theoretical zero passages of the voltage at the terminals of the six cells of the bridge;

Means for processing digital numbers $\epsilon$ proportional to the interval of time separating the passage to real zero and the passage to theoretical zero of the voltage at the terminals of each of the cells of the bridge;

Means for determining the maximum value $\epsilon_{max}$ assumed by $\epsilon$, in the course of an interval of time T, and to place this value $\epsilon_{max}$ in the memory;

Means for processing digital numbers proportional to $r$, $u_{max}$, $(T/2)\gamma$, where $r$ is the bridge regulation angle, $u$ is the maximum trespass angle of the cells, $\gamma$ is the angle of extinction of the cells;

Means for processing two digital numbers called rectifier stop and inverter stop, respectively, equal to $r+\epsilon_{max}$ and $(T/2)-\gamma-\epsilon_{max}-u_{max}$;

Means for processing ignition impulses for the cells of the bridge starting with the second train of impulses staggered by a period of time worked out on the basis of the values of the inverter stop and the rectifier stop.

BACKGROUND OF THE INVENTION

Field of the Invention

This invention relates to a device intended to equip a DC electric power transmission line for the purposes of assuring the correct execution of a given power transmission program under the best possible yield, operating, and safety conditions, regardless of the requirements of the program and the possible operational disturbances. The device according to the invention furthermore can control a bridge functioning as an inverter or as a rectifier.

A DC line, as shown in FIG. 1, involves a source of AC indicated schematically in the drawing by the secondary 2 of a three-phase transformer 1 having a primary 3, a rectification bridge 6 (here, a three-phase Graetz bridge with six rectifier elements 6a to 6f), a two-wire line with two conductors 7a and 7b for DC power transmission, and, at the end of the line, an inverter bridge 8 with six rectifier elements 8a to 8f, mounted in a Graetz bridge, supplying the primary 11 of a transformer 10 having a secondary 12 leading to a network 13.

In this example, the energy flows in the direction from the rectifier bridge 6 to the inverter bridge 8; but this device can function in such a way as to send the energy in the opposite direction. Bridge 8 then works like a rectifier, whereas bridge 6 works as an inverter.

In the following, the invention will be explained, for the sake of simplicity, in the case where bridge 6 works as rectifier and bridge 8 works as inverter; but we must remember that the installation can work in the opposite direction, each bridge being equipped with a device according to the invention.

We known that, when a rectifier device, controlled by semiconductor, for example, (thyristor), or mercury vapor (thyratron), is on rectifier operation, a cell may be ignited only when the voltage at its terminals is positive.

We will designate by rectifier stop $\epsilon$ the minimum delay, calculated as we shall see later on as of the theoretical instant at which the voltage at the terminals of a cell passes to zero, thus permitting the ignition of this cell in full safety. This definition will be used hereafter as we explain the invention.

We know furthermore that, when a bridge is on inverter operation, the order of ignition (turn-on) of an element must be given sufficiently early so as to obtain the extinction of the preceding element, as is known, since otherwise we would get a commutation misfire which is a source of serious damage to the bridge.

We thus define a clearance angle for inverter operation, also called inverter stop, equal to the minimum electrical angle separating the ignition of a given element of an inverter bridge and the passage of the voltage of the element to zero in the course of operation.

Now that we have given these definitions, we must note that a three-phase network may present the following operational anomalies:

1. Under normal operation: (a) a frequency drift may occur; (b) an imbalance may develop in the network, that is to say, the three phases would no longer be equal in amplitude and in harmonics rate; (c) oscillations may occur in the voltage of one or several phases at the moment this voltage or these voltages pass through the zero value.

2. Under abnormal operation: (a) a complete imbalance may develop in the network, and this may lead to the breakdown or disappearance of one or more phases; (b) there may be an abrupt modification in the phase shift of the network with respect to its immediately prior value; (c) the passage of the voltage of one or more phases through the zero value may disappear for a duration corresponding to one or more periods; (d) temporary and untimely passages to zero may occur.

This invention relates to a device which makes it possible—in a DC powerline equipped at each of its ends with a bridge having controlled rectifier cells—to calculate the optimum instant for the ignition of the cells and to furnish the corresponding impulses, considering the requirements of the power transmission program to be carried out, under the best possible yield conditions (low consumption of feedback, in particular), under the best network and cell characteristics, as well as operational anomalies under normal and abnormal operation. Such a device, which is the object of our invention here, consists of an angle computer associated with a pulse generator controlled by said angle computer.

A first requirement which the device must meet is to produce triggering impulses which will remain strictly equidistant outside the regulating periods.

Another requirement is that it must produce impulses during periods of time when ignition is possible (rectifier) or when ignition involves no danger (inverter).

The above-mentioned periods of time must furthermore be so selected as to guarantee safety without causing the power transmission characteristics to become unfavorable: we known that the reactive [idle] power rate, conveyed by the line, is a function that grows at the same time as the value of the inverter stop which characterizes the advance with which we ignite the cells of the inverter bridges. One purpose of this invention is to provide a device making it possible to calculate the turn-on angles with a sufficiently broad margin to assure safe ignition of cells of the inverter bridges and with a sufficiently narrow margin to bring about minimum idle power consumption.

Another purpose of the invention is to offer a device making it possible to produce impulses at correct periods of time, regardless of the requirements of the program and the temporary anomalies which may occur (frequency drift, total imbalance, phase shift modification, disappearance of passage of voltage through zero).

Another purpose of the invention is to provide a device making it possible numerically to calculate the ignition angles of the cells of the bridges, in other words, to calculate these figures with very great precision.

This invention is intended to provide a device for the elaboration of control impulses for an electrical power converter, involving six cells mounted in a three-phase bridge, between an AC network and one end of a DC power transmission line, involving the following:

Means that process a first train of impulses, corresponding to the successive zero passages of the voltage at the terminals of one of the cells of the converter;

Means for processing, from the first impulse train, a second train of impulses which will be spaced apart from each other by an interval of time equal to one-sixteenth of the interval of time T separating two consecutive impulses of the first train, the impulses of the second train corresponding to the theoretical zero passages of the voltage at the terminals of the six cells of the bridge;

Means for processing digital numbers $\epsilon$ proportional to the interval of time separating the passage to real zero and the passage to theoretical zero of the voltage at the terminals of each of the cells of the bridge.

Means for determining the maximum value $\epsilon_{max}$ assumed by $\epsilon$, in the course of an interval of time T, and to place this value $\epsilon_{max}$ in the memory;

Means for processing digital numbers proportional to $r$, $u_{max}$, $(T/2)-\gamma$, where $r$ is the bridge regulation angle, $u$ is the maximum trespass angle of the cells, $\gamma$ is the angle of extinction of the cells;

Means for processing two digital numbers called rectifier stop and inverter stop, respectively, equal to $r+\epsilon_{max}$ and $(T/2) -\gamma-\epsilon_{max}-u_{max}$;

Means for processing ignition impulses for the cells of the bridge starting with the second train of impulses staggered by a period of time worked out on the basis of the values of the inverter stop and the rectifier stop.

The invention will be better understood with the help of the examination of one detailed way of implementing the invention, given here by way of example, without any limitations, and with reference to the attached drawing.

BRIEF DESCRIPTION OF THE DRAWINGS

FIG. 2a is a schematic representation of the impulse production device according to the invention, placed at one of the ends of the line;

FIGS. 2b–2e are diagrams explaining the operation of the device that works out the rectifier stop;

FIG. 2f is a diagram of the logic device processing the maximum quantities of $\epsilon$ or $u$;

FIG. 2g is the diagram of an operational amplifier set up as summation device;

FIG. 2h is the diagram of a circuit for the processing of the ignition impulse train;

FIG. 2j is a diagram of the circuit for the processing of the emergency [aid] impulses;

FIGS. 3a–3c and FIGS. 4a–4e are diagrams explaining the operation of the zero passage detector and the theoretical zero computer;

FIG. 5 is a diagram illustrating the ignition zone permitted for the rectifier or inverter bridges.

DESCRIPTION OF THE PREFERRED EMBODIMENT

Figure 1:
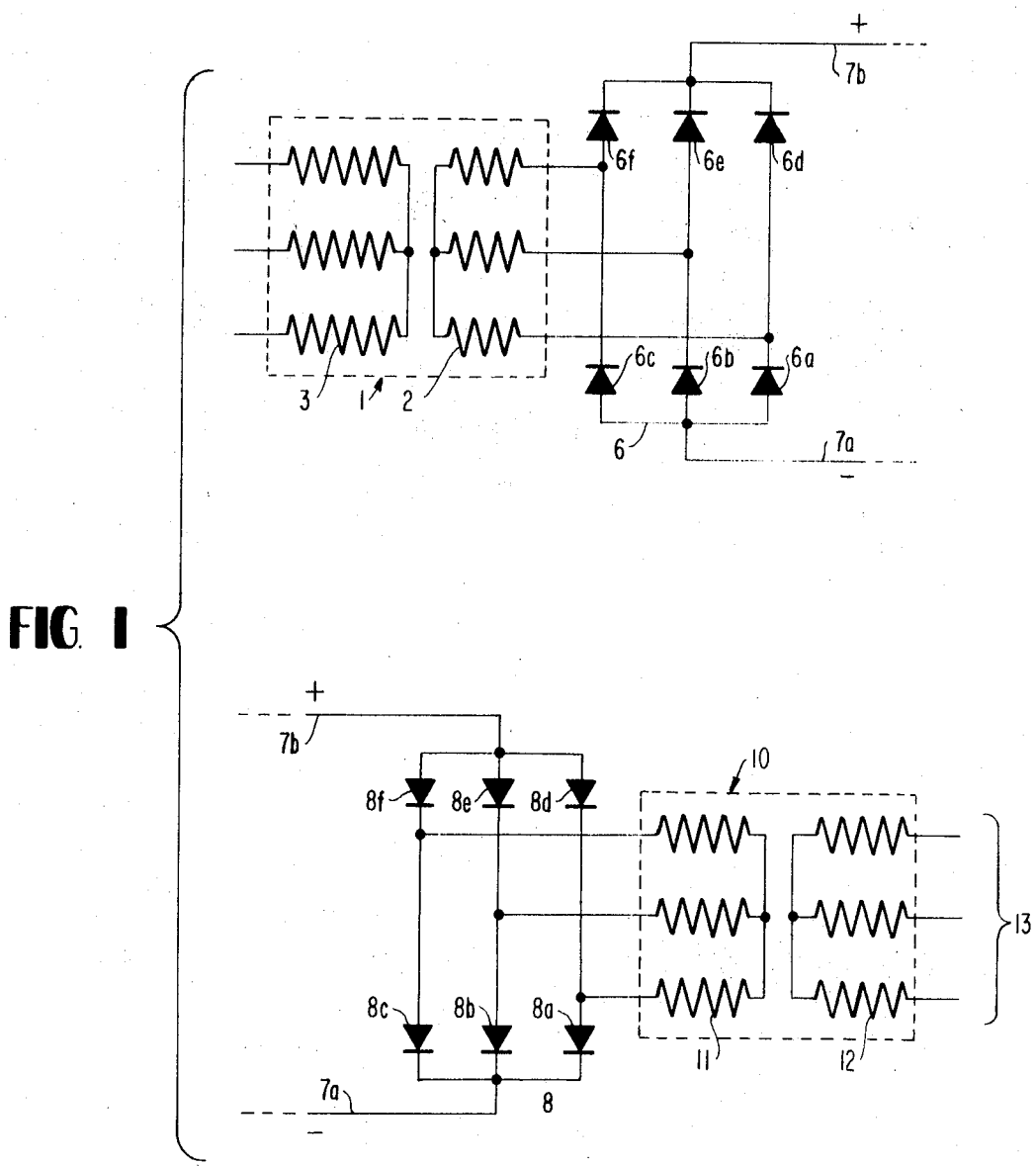
FIG. 1 is a schematic illustration of a DC power transmission line.

The device shown schematically in an overall illustration in FIG. 2a is designed to equip one of the ends of the continuous [DC] line, the other end being equipped with an identical device.

In broad outline, the device is based on the succession of the following operations:

We work out a first impulse train corresponding to the zero passage of the voltage at the terminals of one of the cells of the bridge considered. We designate by T the interval of time separating two consecutive impulses;

Simultaneously, we calculate a digital number proportional to one-sixth of the interval of time T;

We work out a second train of impulses, each separated by an interval of time equal to T/6. These impulses theoretically correspond to the zero passages of the voltage at the terminals of the six cells of the bridge. In fact, for example, because of a frequency drift, an anomaly on the line, or a possible regulation of the network power, the real instants of the passage of the voltage at the terminals of the six cells through zero will be different from the theoretical instant.

By $\epsilon_1, \epsilon_2 ... \epsilon_6$ we shall designate the intervals between the passage of the voltages of the six cells of the bridge to theoretical and real zero.

These quantities $\epsilon$ are positive, negative, or zero.

We work out digital numbers proportional to the values $\epsilon_1$ and $\epsilon_6$.

We store the largest of the $\epsilon$ values in the memory.

Between each impulse of the first train, we compare the successive values of $\epsilon$, to $\epsilon_6$ to the value placed in the memory.

If one of these values is greater than the value placed in the memory, it is this value which we now retain in the memory.

We work out digital numbers proportional to the following quantities:

1. $r=i_r-i$, $r$ here being the angle of regulation, $i$ being the instantaneous phase current, $i_r$ being the instantaneous instruction current;

2. $u$, the trespass angle, that is to say, the interval of time during which two consecutive cells are simultaneously traversed by a current that is not zero. This angle is a function of $i$, of the peak value $v$ of the voltage between phases and of the leakage reactance $x$ of transformer 1;

3. $u_{max}$, the maximum value of $u$ in each interval of time separating two impulses of the first train;

4. $(T/2) -\gamma$, $\gamma$ here being a fixed value, called the angle of extinction, depending upon the type of rectifier cells used.

We work out two digital numbers, one proportional to $(T/2)-\gamma-u_{max}-\epsilon_{max}$, the other one proportional to $\gamma+\epsilon_{max}$. These numbers are respectively called inverter stop and rectifier stop.

We work out a train of ignition impulses for the cells of the bridge. This train is obtained from the second train of impulses whose impulses are staggered by a time worked out on the basis of the values of the inverter stop and the rectifier stop.

Referring now to FIG. 2a, the device includes a voltage zero passage detector 21 whose input is connected to the terminals of one of the bridge cells, for example, cell 6f. This detector is sensitive to the process of passage to zero by growing value [increasing values passing to zero] and involves a locking device which blocks the detector immediately after the first passage of the voltage to zero, so as to take into account only the first passage through zero, in case the passages through zero are close to each other in case of approximate passages through zero (oscillations).

This is a detector of a known type and, for example, includes a transistor whose base is polarized by said voltage at the terminals of cell 6f.

The diagrams in FIGS. 3a–3c illustrate the operation of this detector 21. FIG. 3a shows the variations in the voltage at the terminals of cell 6f as a function of the time. We can see that this voltage may reveal oscillations, such as 31 and 32, in the vicinity of certain passages through zero. The detector is designed to furnish an impulse such as 33 when the voltage passes zero and simultaneously to transmit a locking signal 34 whose duration is adjustable and which prevents any impulse emission for the entire locking duration $t_0$. It is thus possible to eliminate the "parasite zeros" due to oscillations, the normal voltage zeros appearing in the course of the period, and to detect only the first of the zeros of a short series of oscillations.

The zero passage of the voltage at the terminals of cell 6f, selected as reference here, detected by a device 21, is expressed by an impulse 33 at the output of the latter. In this way we work out a first train of impulses through a succession of impulses 33. We designate by T the interval of time separating two consecutive impulses.

This value is fixed if the network is balanced, provided no other anomaly is present and provided we perform no regulation adjustment of the network power.

This value T may vary in the opposite case.

Starting with this first impulse train, we work out a second train of impulses separated from each other, in each sequence T, by a value T/6. This is done with the help of an auxiliary oscillator 22, for example, of the quartz type, furnishing impulses with a stable frequency $f$, on the order of 1 kc. This oscillator is connected to the input of a "modulo 6" counter, 23a, furnishing, at the output, impulses with a frequency of $f/6$. These impulses are sent to a digital counter 23b, equipped with a memory 23c; this counter 23b also receives the impulses furnished by the detector 21 for its return resetting to zero. The counter 23b counts during each interval of time T separating two consecutive impulses furnished by 21.

Figure 4A:
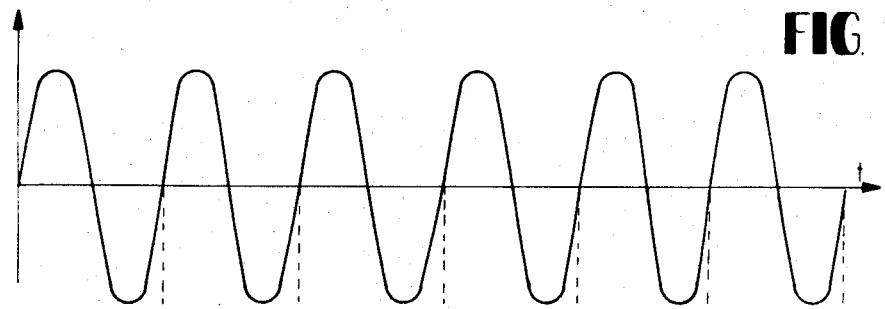
Figure 4B:
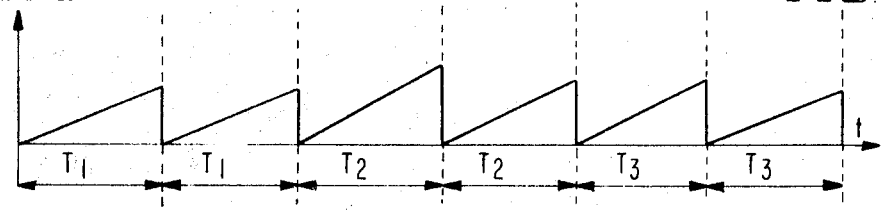

In FIGS. 4a and 4b we have shown the variations of the voltage—as a function of the time—at the terminals of the reference cell 6f, as well as the variations in the content of the counter 23 as a function of the time.

Memory 23c is connected to a first input of a digital comparator 70a, receiving, on a second input, the content of a counter 70b. This counter 70b is connected to oscillator 22 and is reset to zero by the impulses of detector 21. When the contents of counter 70b and of memory 23c are equal, comparator 70a delivers an impulse; this impulse is also used to return counter 70b to zero. The succession of output impulses of comparator 70a constitutes the second above-mentioned train of impulses separated by T/6.

It should be noted that—if after the expiration of a time equal to six times the value T/6 in the memory in 23c, starting from a zero detected by 21, the content of counter 23b has not developed any further—the network is balanced. If this is not so, then it is the instantaneous frequency which has changed and the counter 23b will indicate a larger or smaller number which will be substituted for the preceding one in memory 23c.

Figure 4C:
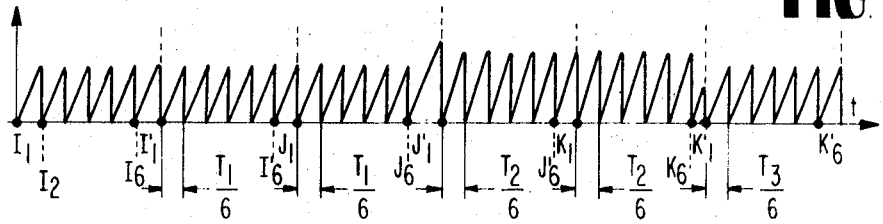

Referring now to FIGS. 4a–4c, let us assume that, for a first time, the time interval T separating two successive zeros has a value of $T_1$. Counter 70b is filled and is emptied according to a period equal to $T_1/6$, the resettings to zero are represented in diagram 4c by points $I_1, I_2 ... I_6; I'_1, I'_2 ... I'_6$. If the value of $T_1$ changes and goes on to a value $T_2$ which is greater than $T_1$, this value $T_2/6$ is stored in the memory at 23c; of course, during the first sequence $T_2$, the comparator 70a furnishes impulses separated by $T_1/6$ ($J_1, J_2 ... J_6$); then in the following sequence, it furnishes impulses separated by $T_2/6$ ($J'_1...J'_6$) (FIG. 4c).

If $T_2$ changes and goes on to a value of $T_3$ which is less than $T_2$, comparator 70a during the first sequence $T_3$ furnishes impulses separated by the value $T_2/6$ ($K_1, K_2...K_6$); counter 70b is reset to zero by member 21 upon the following zero passage of the voltage in the reference cell. This last resetting to zero is however blocked since the five impulses which are $T_2/6$ distant during the first sequence $T_3$, have not been emitted. This may be accomplished by means of an auxiliary counter 70c connected to the output of comparator 70a and reset to zero by the impulses furnished by detector 21; the auxiliary counter counts, in each interval T, five impulses of the second train. Then, when we have the second sequence $T_3$, impulses spaced by $T_3/6$ are furnished ($K'_1, K'_2...K'_6$).

Furthermore, counter 70b can be reset to zero automatically after the fifth impulse of the second train in one of sequences T after a time $T_0/6$, which is selected definitely greater than the normal value T/6 in the case, for example, of the exaggeratedly delayed appearance of an impulse 33 at the output of 21. This case corresponds to an abrupt disappearance of the network voltage or simply a weakening of this voltage. This makes it possible to activate the protection devices in case of failure; that is, if the passage to zero detected by 21 is absent. The impulses of the second train are worked out with the last value of T/6 in the memory.

Figure 4D:
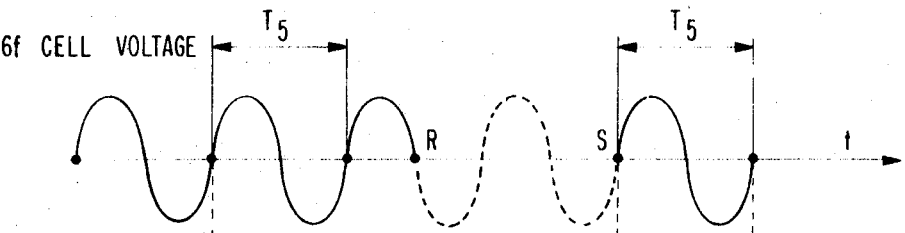
Figure 4E:
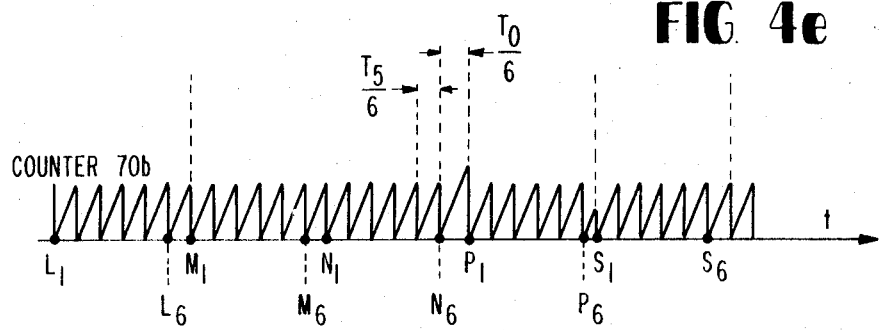

FIG. 4d shows a diagram of a voltage revealing an abrupt fade when its period was constant and equal to $T_5$; FIG. 4e shows the evolution of counter 70b.

The evolution of counter 70b is shown by the sawteeth of $T_5/6$ $L_1...L_6$, $M_1...M_6$, $N_1...N_6$. These last-mentioned sawteeth are followed, after the fade R of the voltage, by sawteeth $P_1...P_6$; after an interval $N_6P_1$, in the course of which counter 70b has reached its maximum regulation value $T_0/6$ the sawteeth are $T_5/6$ apart.

The voltage restoration is detected by the zero passage S and the impulses of the second train are furnished as before (FIG. 4c).

The device (FIG. 2a) also includes a detector device 60 for detecting the zero passage of the voltage at the terminals of each of the bridge cells. This device is identical to device 21 and works out a third impulse train 61.

The second impulse train, which comes out of comparator 70a, is delivered to a counter 80 of the digital type which is triggered upon the appearance of each impulse of this second train and counts the frequency impulses $f$ delivered by oscillator 22. This counter 80 is stopped and reset to zero by the impulses of the third train furnished by detector 60. We note that, when the impulse of the second train, which triggers the starting of counter 80, corresponds to a theoretical zero of the voltage of the first cell, it is the impulse of the third train, corresponding to the real zero of the voltage of the second cell, which stops counter 80. This counter then delivers a number proportional to $(T/6)\pm\epsilon$, T/6 being the interval between consecutive impulses of the second train in the time T considered and $\epsilon$ being the interval at the instants when the voltage of one and the same cell passes to real and theoretical zero. In practice, to make this measurement of T/6 $\pm\epsilon$, counter 80 is made up of two identical counters 80a and 80b whose operation is described below.

FIGS. 2b–2e show diagrams illustrating the operation of counters 80a and 80b. In a sequence of duration T we represented, in FIG. 2b, by points A, B...F, the instant at which the voltage at the terminals of the six bridge cells passes to theoretical zero; the impulses of the second train are emitted at these instants. These impulses are equidistant from T/6. In FIG. 2c, by means of Points A', B'...F', we showed the instants of passage to real zero, measured by detectors 60. At these instants, the impulses of the third train are emitted. In FIG. 2d, we showed—as a function of the time—the evolution of the content of counter 80a and in FIG. 2e we showed the evolution of the content of counter 80b.

Counter 80a is started by the odd impulses (A, C, E) of the second train and it is blocked by the even impulses (B', D', F') of the third train; inversely, counter 80b is started by the even impulses (B, D, F) of the second train and it is blocked by the uneven impulses A', C', E') of the third train. Thus, regardless of the sign of the interval $\epsilon$ between the real zero and the theoretical zero for one and the same cell, we successively get the six measurements of $(T/6)\pm\epsilon$ in the sequence T. The inputs of the counters are equipped in the known manner with multiplexer switches, not shown here, permitting the switching routing of the impulses of the second and third trains. We preferred the measurement of $(T/6)\pm\epsilon$ to the measurement of $\epsilon$ in order to avoid counting errors in case of coincidence of a real zero and a theoretical zero in one cell (See Points C and C', FIGS. 2b and 2c).

The measurements of T/6$\pm\epsilon$ furnished at the outputs of the counters 80a and 80b enable us to calculate the various absolute values of $\epsilon$ in the sequence T. For this purpose, the outputs of counters 80a and 80b are connected to a subtraction circuit 81 receiving, on a second input, the memory-stored value T/6 at 23c. This subtraction circuit 81 successively delivers the 6 values $\epsilon$ in the sequence T. These values are furnished to the logic circuit 90 including (see FIG. 2f) two memories 91 and 92, connected to each other by a first AND-circuit 93, and a comparator circuit 94 whose output is connected to a second input of AND-circuit 93.

This logic circuit is intended to select, among the six values of $\epsilon$, the biggest value, that is $\epsilon_{max}$. This circuit operates in the following manner:

Let us assume that $\epsilon_0$ is the memory-stored value in 92, and $\epsilon_1$ is the first value presenting itself at 91. The comparator circuit 94 compares these two values and if $\epsilon_1$ is greater than $\epsilon_0$, it furnishes an impulse which unlocks the gate 93 and the value $\epsilon_1$ is substituted for $\epsilon_0$ in the memory 92. In the opposite case ($\epsilon_1$ smaller than $\epsilon_0$), the gate 93 remains locked and the value $\epsilon_0$ is kept in the memory at 92. When the following value $\epsilon_2$ is processed by 81, it is substituted for $\epsilon_1$ in memory 91 and a new comparison is made.

The logic member 90 is furthermore activated in such a manner as to permit a change of the value $\epsilon_{max}$ in the memory at 92 if the successive values of $\epsilon$ processed by 81 are constantly smaller than $\epsilon_{max}$. For this purpose the logic circuit 90 furthermore includes a counter 95, for example, with six registers counting the impulses 33 of detector 21; this counter 95 is reset to zero each time the comparator detects, at 91, a value greater than the memory-stored value at 92. When counter 95 has registered six successive impulses 33, it unlocks a gate 96 and the content of memory 91 is transferred to memory 92.

The rectifier stop has the function of preventing the turn-on signals from reaching the cells before the voltage at their terminals has become positive.

This value $\epsilon_{max}$ can be used as a rectifier stop only when the network power remains constant. Since it is necessary to be able to modify the network power, we work out a regulating signal $r$ which is a function of this power and which enters into the value of the stop in the form $\epsilon_{max}+r$. This value $r$ is proportional to the difference between the instruction value $i_r$ of the current intensity in the cell and the instantaneous value $i$ of this intensity. The processing signal $i$ will be described later on.

The inverter stop, equal to $(T/2)-\gamma-u_{max}-\epsilon_{max}$, requires the processing of the quantities $(T/2)-\gamma$ and $u$.

The processing of $(T/2)-\gamma$ is accomplished, starting with oscillator 22, by means of a "modulo 2" counter 40 furnishing impulses of frequency $f/2$. These impulses are set to a digital counter 41 which is reset to zero by the impulses 33 furnished by detector 21. The content of counter 41 is stored in the memory at 42, at the moment counter 41 is reset to zero. Memory 42 is connected to a digital subtractor (full adder) circuit 50, receiving, on another input, a digital number $\gamma$ proportional to the angle of extinction of each cell, this angle being a constant for a given rectifier and being furnished by the manufacturer of the rectifiers used. In each sequence T we then have the value $(T/2)-\gamma$ at the output of subtractor 50.

The processing of the value $u_{max}$ is accomplished on the basis of the calculated values of $u$, $u$ here being the angle of trespass which, by definition, is the interval of time during which two consecutive cells are simultaneously traversed by a nonzero current. The instantaneous values of $u$ are calculated by a function generator 24, from the instantaneous value $i$ of the current in the bridge, from the peak value V of the voltage between phases, and from the leakage reactance X of the transformer 1. The analog signal coming from generator 24 is coded numerically with the help of an analog-to-digital converter (AD converter) 25, receiving the analog signal through a multiplexer switch 26 with two channels whose role will be explained later on. The AD converter 25 has an output at which are delivered the digital values assumed by $u$. The computation of $u$ is performed in the known manner, in fact, at least several tens of times per sequence T.

As earlier in the case of $\epsilon$, the value assumed by $u$ in the computation of the inverter stop will be changed immediately if it begins to grow, whereas we will wait for a few sequences T (6T) for the change if the value of $u$ are constantly smaller than those used earlier. A logic member 27 makes the selection of $u_{max}$; this member 27 is identical to member 90.

The elaboration of the regulating signal $r$ is accomplished by an operational amplifier 28 set up as summation device (adder) (FIG. 2g) and receiving at the inputs the values $i$ and $-i_r$.

The analog output signal $i_r-i$ is converted into a digital signal $r$ by means of AD converter 25. The multiplexer switch 26 makes it possible to use only one AD converter. Converter 25 then delivers the numerical signal $r$.

Referring now to FIG. 2h;

The calculation of rectifier stop $\epsilon_{max}+r$ is performed in a first full adder 31a.

The calculation of the inverter stop $(T/2)-\gamma-u_{max}-\epsilon_{max}$ is performed in a second full adder 31b.

The determination of the turn-on [ignition] angle permitting the generation of impulses for the successive control of the cells of the bridge is obtained by means of a comparator 30c receiving in its inputs the values $\epsilon_{max}+r$ and $(T/2)-\gamma-u_{max}-\epsilon_{max}$. The comparator 30c determines the smallest of these two values and transmits that value, by means of two AND-gates 30d, 30e, whose outputs are connected by an OR-circuit 30f.

The generation of the train of control impulses is performed by a digital counter 29 which is reset to zero and which is started by the impulses furnished by comparator 70a and which counts the impulses of frequency $f$ of the oscillator 22. The counter furnishes an impulse whenever its content is equal to the value delivered at the output of OR-gate 30f.

If the quantity $\epsilon_{max}+r$ is smaller than the inverter stop, the cell turn-on order is given when the content of counter 29 and said quantity $\epsilon_{max}+r$ are equal. If $r$ is zero or negative, the turn-on instant corresponds to the rectifier stop. If $r+\epsilon_{max}$ is greater than the inverter stop, the turn-on order is triggered when the content of counter 29 and the inverter stop are equal. The turn-on orders are routed to the corresponding cells by an appropriate device 32.

FIG. 5 illustrates this method of turn-on; the crosshatched zones are the forbidden turn-on zones, points 0 and R correspond respectively, to the limit turn-on point for inverter operation and to the limit turn-on point for rectifier operation. The straight line $z(t)$ represents the evolution of the content of counter 29 as a function of time $t$.

The device is completed (FIG. 2j) by a circuit permanently furnishing six safety impulses; this circuit includes a transformer 39 with a saturated magnetic circuit whose primary receives a voltage proportional to the voltage at the terminals of the bridge cells. Such a transformer furnishes impulses staggered 90° with respect to the input signal. These impulses are suitable for the purpose of turning the cells on. These impulses are transmitted to the cells by means of an AND-circuit 40, receiving, on a first input, the impulses coming from 39 and, on a second input, some signals when anomalies are detected on the bridge. Thus, the AND circuit may be opened, either by a selected value of $\epsilon$ expressing an abnormal interval between theoretical and real zero passages, that is to say, caused, for example, by a network defect or a computation mistake, or by any other criterion selected (short-circuit on the line, detection of a turn-on failure, etc.).

What is claimed is:

1. A device for processing of impulses for the control of an electrical power converter, including six cells mounted in the form of a three-phase bridge, between an AC network and the end of a DC power transfer line, including:

Means generating a first train of impulses corresponding to the successive zero passages of the voltage at the terminals of one of said cells, said means for generating a first train of impulses comprises a voltage zero passage detector, connected to the terminals of one of the cells of the converter;

means for generating from said first train of impulses, a second train of impulses which are spaced apart from each other by an interval of time equal to one-sixth of the interval of time, T, separating two consecutive impulses of said first train, the impulses of said second train corresponding to the theoretical zero passages of the voltage at the terminals of the six cells of said bridge(;) said means for generating a second train of impulses comprises a "modulo 6" counter whose input is connected to an oscillator delivering impulses with a frequency on the order of 1 kc. and a digital counter equipped with a memory connected to the output of the "modulo 6" counter, said digital counter being reset to zero by each of the impulses of the first train, the content of the counter being transferred into the memory upon each resetting to zero, and a digital comparator receiving, on a first input, the content of the memory, on a second input the content of a counter, supplied by the impulses of the oscillator, said comparator emitting an impulse when the number of impulses received at the second input attains the content of the memory;

means for generating digital numbers $\epsilon$ proportional to the interval of time separating the real zero passage and the theoretical zero passage of the voltage at the terminals of each of the cells of the bridge;

means for storing the maximum value $\epsilon_{max}$ assumed by $\epsilon$ in the course of an interval of time T;

means for calculating digital numbers proportional to $r$, $u_{max}$, $(T/2)-\gamma$, where $r$ is the regulation angle of the bridge, $u$ is the maximum trespass angle of the cells, $\gamma$ is the cell extinction angle;

means for calculating two digital numbers called rectifier stop and inverter stop, respectively, equal to $r$ 30 $\epsilon_{max}$ and $(T/2)-\gamma-\epsilon_{max}-u_{max}$; and means for generating turn-on impulses for the cells of said bridge starting with the second impulse train staggered by a period of time worked out on the basis of the values of the inverter stop and the rectifier stop.

2. A device according to claim 1, characterized by the fact that the means for processing the digital numbers $\epsilon$ include voltage zero passage detectors, connected to the terminals of each of the cells of the bridge, a digital counter receiving the impulses of the oscillator, this counter being started by each impulse of the second train and being reset to zero by the impulses furnished by the above-mentioned voltage zero passage detectors.

3. A device according to claim 2 characterized by the fact that, in each interval T, the digital counter is reset to zero by an impulse of the nth cell, the counter being started by the theoretical impulse corresponding to the $(n-1)$th cell, means being provided for subtracting the content of the memory from the content of the digital counter.

4. A device according to claim 3, characterized by the fact that the means for determining the maximum value $\epsilon_{max}$ include a first memory connected to the output of subtractor means and a second memory being able to receive the content of the first memory, a comparator comparing the content of the memories and furnishing a control signal permitting the transfer of the content of the first memory into the second memory when the content of the first memory is greater than that of the second memory.

5. A device according to claim 4 characterized by the fact that the means for determining the value $\epsilon_{max}$ include a counter which counts the impulses of the first train, reset to zero by the control impulses delivered by the comparator, said counter controlling the transfer of the content of the first memory into the second memory when the counter has counted a given number.

6. A device according to claim 1 characterized by the fact that the means for working out the digital number $(T/2)-\gamma$ include a "modulo 2" counter whose input is connected to said oscillator, a digital counter receiving the impulses furnished by the "modulo 2" counter and being reset to zero by the successive impulses of the first train, a memory associated with said counter and a digital subtractor circuit receiving, on a first input, the content of memory and, on a second input, a digital number $\gamma$ proportional to the angle of extinction of the cells of the bridge.

7. A device according to claim 1 characterized by the fact that the means for working out the turn-on impulses of the cells of the bridge include a counter which counts the impulses of the oscillator received at a first input and reset to zero by the impulses of the second train, a first digital comparator comparing the two stops and furnishing, on a second input of counter, the smaller of the two stops, the counter working out an impulse whenever the numbers at its inputs are equal.

8. A device for the processing of impulses for the control of an electrical power converter, including six cells mounted in the form of a three-phase bridge, between an AC network and the end of a DC power transfer line, including:

Means generating a first train of impulses, corresponding to the successive zero passages of the voltage at the terminals of one of said cells;

means for generating from said first train of impulses, a second train of impulses which are spaced apart from each other by an interval of time equal to one-sixth of the interval of time, T separating two consecutive impulses of said first train, the impulses of said second train corresponding to the theoretical zero passages of the voltage at the terminals of the six cells of said bridge;

means for generating digital numbers $\epsilon$ proportional to the interval of time separating the real zero passage and the theoretical zero passage of the voltage at the terminals of each of the cells of the bridge;

means for storing the maximum value $\epsilon_{max}$ assumed by $\epsilon$ in the course of an interval of time T;

means for calculating digital numbers proportional to $r$, $u_{max}$, $(T/2)-\gamma$, where $r$ is the regulation angle of the bridge, $u$ is the maximum trespass angle of the cells, $\gamma$ is the cell extinction angle said means for working out the digital number $u_{max}$ involves a function generator elaborating an analog signal which is a function of $i$, the instantaneous value of the current in the bridge, $v$ the peak voltage at the terminals of one bridge cell and X, the leakage reactance of the transformer associated with the bridge, an AD converter receiving said analog signal and furnishing a digital number, means for determining the value $u_{max}$ among several values $u$ elaborated in each interval time T, said means for determining $u_{max}$ further including a first memory connected to the output of the AD converter and a second memory capable of receiving the content of the first memory, a comparator comparing the content of the memories and furnishing a control signal permitting the transfer of the content of the first memory into the second memory when the content of the first memory is greater than the content of the second memory;

means for calculating two digital numbers called rectifier stop and inverter stop, respectively, equal to $r + \epsilon_{max}$ and $(T/2)-\gamma-\epsilon_{max}-u_{max}$; and means for generating turn-on impulses for the cells of said bridge starting with the second impulse train staggered by a period of time worked out on the basis of the values of the inverter stop and the rectifier stop.

9. A device according to claim 8 characterized by the fact that the means for determining the value $u_{max}$ include a counter which counts the impulses of the first train, reset to zero by the control impulses delivered by the comparator, said counter controlling the transfer of the content of the first memory into the second memory when the counter has counted a given number.

* * * * *